United States Patent Office.

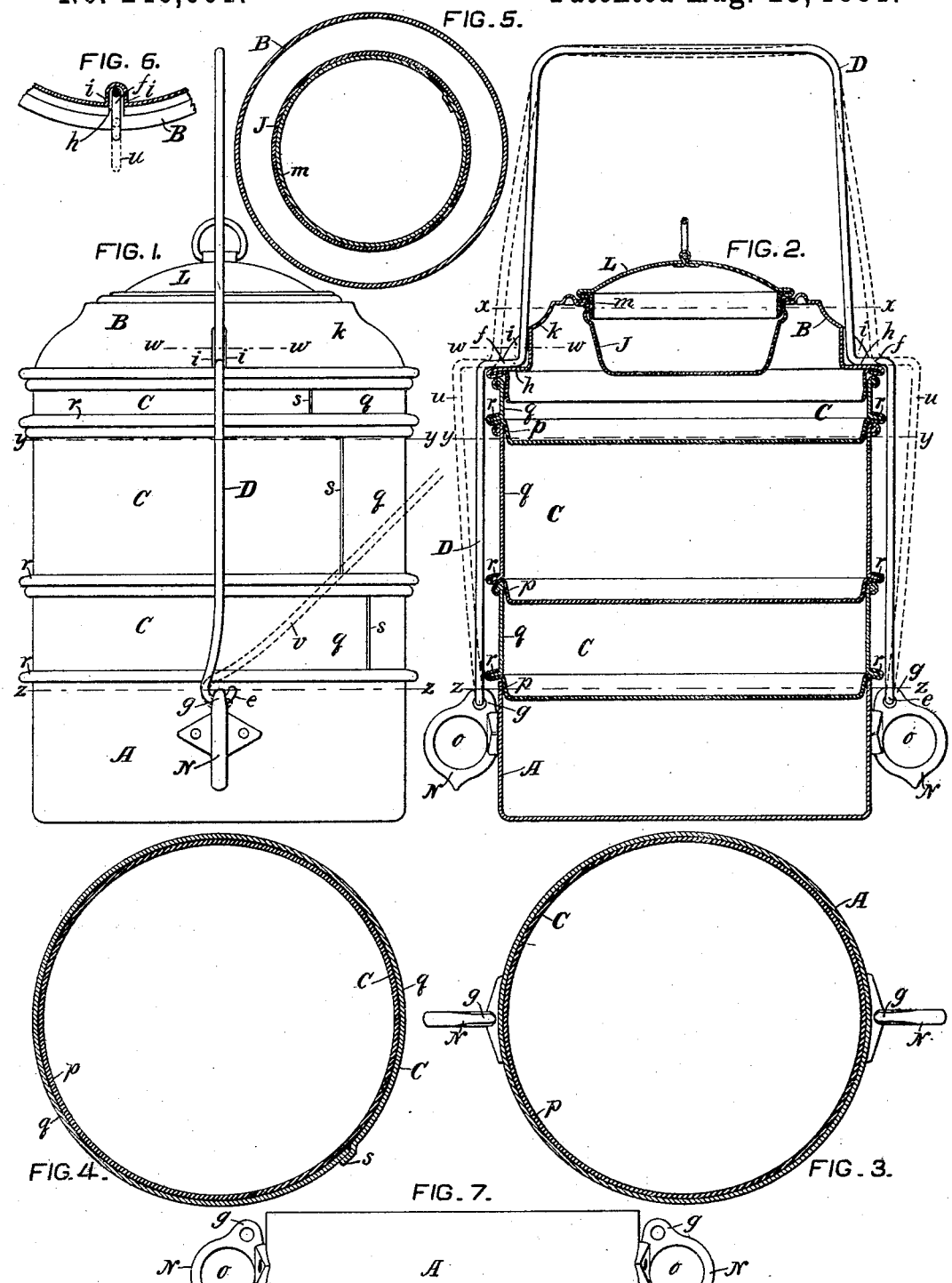

LUCIUS A. GARRETT, OF WEST TROY, NEW YORK.

DINNER-PAIL.

SPECIFICATION forming part of Letters Patent No. 246,601, dated August 23, 1881.

Application filed January 29, 1881. (No model.)

*To all whom it may concern:*

Be it known that I, LUCIUS A. GARRETT, a citizen of the United States, residing in the village of West Troy, in the county of Albany and State of New York, have invented new and useful Improvements in Dinner-Pails, of which the following is a specification, reference being had to the accompanying drawings.

My invention relates to improvements in dinner-pails in which a series of vessels are detachably secured together, one upon another, with a cover on top; and the general objects of my improvements are to give an improved, cheap, and durable construction to the bail, cover, and lower vessel, whereby all the parts can be quickly and firmly secured together and released by operating the bail only; to strengthen the cover, improve its appearance, and utilize it as a vessel for food, sauce, or condiments; to cheaply adapt the lower vessel for convenient engagement with the bail, and for handy use as a dipping and carrying cup and cooking-vessel, and to produce tight joints between the vessels and shield such joints from falling rain, snow, and dust.

In the aforesaid drawings, Figure 1 is a side elevation of one of my improved dinner-pails, and Fig. 2 is a sectional elevation of the same. Fig. 3 is a horizontal section at and plan of parts below the line $z\,z$ in Figs. 1 and 2; Fig. 4, a horizontal section at the line $y\,y$ in Figs. 2 and 1; Fig. 5, a horizontal section at the line $x\,x$ in Fig. 2, and Fig. 6 a horizontal section at the line $w\,w$ in Figs. 2 and 1. Fig. 7 is a side elevation of the lower vessel of the same dinner-pail detached for separate use as a handy cup or cooking-vessel.

A is the bottom vessel; B, the cover; C C C, the intermediate vessels, and D the bail, each separable from the others.

In order to provide very cheap and durable means whereby all the vessels, cover, and bail can be quickly and firmly secured together for carrying by the bail, and all readily released by operating only the bail, I form the bail with hooks $e$ at its ends, and with inward bends $f$ in the plane of the bail, at suitable distances from the hooks, and fasten to the lower vessel perforated ears $g$, to receive the hooked ends of the bail, and form the cover B with bearings $h$, recessed or between projections $i\,i$ on the cover. By this construction, when all the vessels and the cover shall be placed together as represented in Figs. 1 and 2, the hooks $e$ of the bail can be freely inserted in the ears $g$ by applying the bail thereto in a horizontal or inclined position, as indicated by dotted lines at $v$ in Fig. 1; and the bail, when thus engaged with the ears, can be turned into the upright position upon being sprung or pressed outward, as indicated by dotted lines at $u\,u$ in Fig. 2, and can then be sprung or pressed inward tightly upon the recessed bearings $h$ on the cover, as represented in full lines in Fig. 2, so as to thereby firmly secure all the parts together in proper condition for carrying by the bail, and yet so that all the parts can be freely separated after merely springing or pressing outward the bail, as indicated by the dotted lines $u\,u$ in Fig. 2, and then turning the bail down into a horizontal or inclined position.

In order to strengthen the cover, improve its appearance, and utilize it as a vessel for carrying food, sauce, or condiments, I make the cover B of a general arched form, and with a vessel, J, secured to and suspended by its rim from the top part of the arch portion $k$ and within the space surrounded and covered by such arch part, and furnish the vessel J with a removable cover, L, having a downward flange, $m$, fitting tightly but detachably in and against the upper part of the wall of the vessel, all substantially as shown by Figs. 1, 2, and 5.

To cheaply adapt the bottom vessel, A, for convenient attachment to the bail D and handy use as a cup and cooking-vessel, I form and rigidly fasten at two diametrically-opposite places upon the outer surface of that vessel two outwardly-projecting handles, N N, each consisting of one piece of metal having the opening $o$, through which a person can insert a finger, and having a perforated ear, $g$, formed to receive the hook $e$ on the bail, all substantially as represented in the drawings.

The bottom vessel, A, is intended to contain liquid food.

To make a sufficiently water-tight joint by and between that vessel and the one that fits over and into it, I construct the vessel A from one piece of ductile metal by the use of dies in a well-known manner, without any upright seam or joint in the whole circumference of its upright portion, as shown in Fig. 3, and also make that lower part, p, of the vessel C which fits tightly into the vessel A of one piece of metal, without any seam or joint in its whole periphery, as indicated in Fig. 3; and to provide a shield to protect the joint between the vessels A and C against falling rain, snow, and dust, I unite the lower part, p, of the vessel C to its upper part, q, by a seam in the form of an annular flange, r, projecting laterally and downwardly over and beyond the top or rim of the vessel A, substantially as shown by Figs. 1 and 2.

In order to produce a sufficiently tight joint by and between any and each two of the vessels C when placed and secured together in the pail, and to protect such joint from falling rain and dust, I make the upper cylindrical portion, q, of each of the vessels C with a lap joint or seam, s, Fig. 4, which is flush on the inner surface, as shown, and make the lower portion, p, of each vessel C without any joint or seam in its circumference, and so as to fit tightly within the rim of the upper part, q, of the other vessels, as in Figs. 2 and 4, and unite the lower and upper parts, p q, of each vessel C by a seam or joint in the form of an annular flange, r, adapted to fit upon and extend outward and downward over and beyond the top rim of the upper portion, q, of the other vessels C, as indicated in Fig. 2.

I am aware that prior to my invention dinner-pails have had a series of detachable vessels placed in and upon one another, with a cover, and outer lateral annular flanges at the junctions of the vessels, all secured together by means of a bail and fastening devices, and I do not broadly claim such a dinner-pail, nor any portion thereof.

What I claim as my invention is—

1. A dinner-pail having in combination a series of detachable vessels fitting together, a removable cover, perforated ears g g on the lower vessel, recessed bearings h h on the cover, and the detachable bail D, having end hooks, e, and lateral bends f, all substantially as described.

2. In a dinner-pail, the combination, with the arched cover B, of the vessel J, suspended by its rim from and within the arched cover, and having the removable cover L, all substantially as set forth.

3. In a sectional dinner-pail, the combination, with the bottom vessel, A, of the two opposite handles N N, fast on that vessel, and each having the finger-aperture o and perforated bail-ear g, as described.

4. In a sectional dinner-pail, the combination, with the seamless bottom vessel, A, of the removable vessel C, having the seamless lower portion, p, fitting tightly in the upper part of vessel A, and the annular flange r, extending outward and downward over and beyond the rim of said bottom vessel, as set forth.

5. In a sectional dinner-pail, the combination of two separable vessels, C C, each having its upper portion, q, formed with the lap-joint s, flush on the inner surface, and the seamless lower part, p, adapted to fit tightly in said upper portion of the other vessel, and the two portions of each vessel being united by the annular laterally and downwardly projecting flange-joint r, as shown and described.

In testimony whereof I hereunto set my hand, in the presence of two subscribing witnesses, this 26th day of January, 1881.

LUCIUS A. GARRETT.

Witnesses:
JAMES H. SLADE,
JAMES T. GOODFELLOW.